United States Patent
Deane et al.

(10) Patent No.: US 7,597,255 B2
(45) Date of Patent: *Oct. 6, 2009

(54) SYSTEM AND METHOD FOR REDEEMING REWARDS AND INCENTIVES

(75) Inventors: Michele Shiber Deane, Chester, VA (US); Clyde Samuel Edmonds, Jr., Mechanicsville, VA (US); Charles Aaron Rosenblatt, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 626 days.

This patent is subject to a terminal disclaimer.

(21) Appl. No.: 11/239,724

(22) Filed: Sep. 29, 2005

(65) Prior Publication Data

US 2006/0027647 A1 Feb. 9, 2006

Related U.S. Application Data

(63) Continuation-in-part of application No. 10/740,707, filed on Dec. 18, 2003, now Pat. No. 7,090,138.

(51) Int. Cl.
G06K 5/00 (2006.01)
(52) U.S. Cl. .................................. 235/383; 235/380
(58) Field of Classification Search ................. 235/493, 235/449, 492, 380, 381, 383, 382, 375
See application file for complete search history.

(56) References Cited

U.S. PATENT DOCUMENTS

| | | | |
|---|---|---|---|
| 2,616,612 A | 11/1952 | Guttman | |
| 3,505,954 A | 4/1970 | Projansky | |
| 3,583,317 A | 6/1971 | Gibson | |
| 3,637,994 A | 1/1972 | Ellingboe | |
| 3,876,864 A | 4/1975 | Clark et al. | |
| D264,853 S | 6/1982 | Scavino et al. | |
| 4,360,728 A | 11/1982 | Drexler | |
| D270,546 S | 9/1983 | Malmberg | |
| 4,443,027 A | 4/1984 | McNeely et al. | |
| 4,507,550 A | 3/1985 | Fleer | |
| D280,214 S | 8/1985 | Opel | |
| 4,562,342 A | 12/1985 | Solo | |

(Continued)

FOREIGN PATENT DOCUMENTS

CA 2303827 A1 9/2001

(Continued)

OTHER PUBLICATIONS

Discover 2Go Card; http://www.discover2go.com; Jan. 15, 2003; 5 pages.

(Continued)

*Primary Examiner*—Thien M Le
(74) *Attorney, Agent, or Firm*—Baker & McKenzie LLP (57) ABSTRACT

A transaction card, including a substrate having a front face and a back face, a first magnetic stripe for storing data associated with a credit account, the first magnetic stripe being located along an edge of the back face, a second magnetic stripe for storing data associated with a rewards account, the second magnetic stripe being located along another edge of the back face, and account information located on the front face, the account information being associated with the credit account and the rewards account.

23 Claims, 7 Drawing Sheets

U.S. PATENT DOCUMENTS

| | | | |
|---|---|---|---|
| 4,609,812 | A | 9/1986 | Drexler |
| 4,620,727 | A | 11/1986 | Stockburger et al. |
| 4,634,848 | A | 1/1987 | Shinohara et al. |
| 4,645,916 | A | 2/1987 | Raisleger |
| 4,656,346 | A | 4/1987 | Drexler |
| 4,659,914 | A | 4/1987 | Kondo et al. |
| D290,136 | S | 6/1987 | Ball et al. |
| 4,683,371 | A | 7/1987 | Drexler |
| 4,752,676 | A | 6/1988 | Leonard et al. |
| 4,806,740 | A | 2/1989 | Gold |
| 4,855,583 | A | 8/1989 | Fraser et al. |
| D305,887 | S | 2/1990 | Nishimura |
| D310,386 | S | 9/1990 | Michels et al. |
| 5,128,524 | A | 7/1992 | Anglin et al. |
| 5,171,039 | A | 12/1992 | Dusek |
| 5,308,121 | A | 5/1994 | Gunn |
| 5,326,964 | A | 7/1994 | Risser |
| D358,419 | S | 5/1995 | Runyan |
| D359,305 | S | 6/1995 | Finkelstein |
| 5,424,523 | A | 6/1995 | Ohno et al. |
| 5,440,108 | A | 8/1995 | Tran et al. |
| D367,273 | S | 2/1996 | Ebe |
| 5,550,709 | A | 8/1996 | Iwasaki |
| 5,559,885 | A | 9/1996 | Drexler et al. |
| D374,870 | S | 10/1996 | Gaumet |
| D375,303 | S | 11/1996 | Gaumet |
| D379,006 | S | 4/1997 | Gaumet |
| D387,802 | S | 12/1997 | Finkelstein et al. |
| 5,700,037 | A | 12/1997 | Keller |
| 5,760,381 | A | 6/1998 | Stich et al. |
| 5,818,030 | A | 10/1998 | Reyes |
| 5,844,230 | A | 12/1998 | Lalonde |
| D406,861 | S | 3/1999 | Leedy |
| 5,883,377 | A | 3/1999 | Chapin |
| 5,918,909 | A | 7/1999 | Fiala et al. |
| 5,975,302 | A | 11/1999 | Young |
| 5,984,191 | A | 11/1999 | Chapin |
| D427,167 | S | 6/2000 | Iwasaki |
| 6,107,221 | A | 8/2000 | Nakajima et al. |
| 6,138,917 | A | 10/2000 | Chapin |
| D434,041 | S | 11/2000 | Burke |
| D436,620 | S | 1/2001 | Webb et al. |
| D436,991 | S | 1/2001 | Morgante |
| D437,882 | S | 2/2001 | Creighton |
| D438,562 | S | 3/2001 | Webb et al. |
| D438,563 | S | 3/2001 | Webb et al. |
| 6,222,914 | B1 | 4/2001 | McMullin |
| D442,222 | S | 5/2001 | Webb et al. |
| D442,627 | S | 5/2001 | Webb et al. |
| D442,628 | S | 5/2001 | Webb et al. |
| D442,629 | S | 5/2001 | Webb et al. |
| D443,298 | S | 6/2001 | Webb et al. |
| D447,515 | S | 9/2001 | Faenza et al. |
| 6,290,137 | B1 | 9/2001 | Kiekhaefer |
| D449,336 | S | 10/2001 | Webb et al. |
| 6,296,188 | B1 | 10/2001 | Kiekhaefer |
| 6,315,206 | B1 | 11/2001 | Hansen |
| D453,160 | S | 1/2002 | Pentz et al. |
| D453,161 | S | 1/2002 | Pentz |
| D453,336 | S | 2/2002 | Pentz et al. |
| D453,338 | S | 2/2002 | Pentz et al. |
| D453,339 | S | 2/2002 | Pentz |
| D453,516 | S | 2/2002 | Pentz |
| D453,517 | S | 2/2002 | Pentz |
| D454,910 | S | 3/2002 | Smith et al. |
| D456,814 | S | 5/2002 | Pentz |
| D457,556 | S | 5/2002 | Hochschild |
| 6,386,591 | B1 | 5/2002 | Blank |
| 6,402,029 | B1 | 6/2002 | Gangi |
| 6,402,039 | B1 | 6/2002 | Freeman et al. |
| D460,455 | S | 7/2002 | Pentz |
| D461,477 | S | 8/2002 | Pentz |
| 6,439,613 | B2 | 8/2002 | Klure |
| D462,965 | S | 9/2002 | Pentz et al. |
| D462,966 | S | 9/2002 | Pentz et al. |
| D464,355 | S | 10/2002 | Burke |
| 6,471,127 | B2 | 10/2002 | Pentz et al. |
| 6,484,940 | B1 | 11/2002 | Dilday et al. |
| D467,247 | S | 12/2002 | Pentz |
| D468,313 | S | 1/2003 | Burke |
| D469,777 | S | 2/2003 | Burke |
| 6,543,809 | B1 | 4/2003 | Kistner et al. |
| 6,561,432 | B1 | 5/2003 | Vedder et al. |
| 6,588,658 | B1 | 7/2003 | Blank |
| 6,594,640 | B1 | 7/2003 | Postrel |
| 6,601,769 | B2 | 8/2003 | Barnhill |
| 6,631,849 | B2 | 10/2003 | Blossom |
| 6,693,544 | B1 | 2/2004 | Hebbecker |
| 6,698,116 | B2 | 3/2004 | Waldron |
| 6,834,809 | B2 | 12/2004 | Ogushi |
| 7,090,138 | B2 * | 8/2006 | Rettenmyer et al. ......... 235/493 |
| 2001/0034720 | A1 | 10/2001 | Armes |
| 2001/0054003 | A1 | 12/2001 | Chien et al. |
| 2002/0139849 | A1 | 10/2002 | Gangi |
| 2002/0152116 | A1 | 10/2002 | Yan et al. |
| 2002/0198779 | A1 | 12/2002 | Rowen et al. |
| 2003/0024995 | A1 | 2/2003 | Conner et al. |
| 2003/0069846 | A1 | 4/2003 | Marcon |
| 2003/0075609 | A1 | 4/2003 | Kim |
| 2003/0083933 | A1 | 5/2003 | McAlear |
| 2003/0111527 | A1 | 6/2003 | Blossom |
| 2003/0209608 | A1 | 11/2003 | Blossom |
| 2004/0011877 | A1 | 1/2004 | Reppermund |
| 2004/0026915 | A1 | 2/2004 | Thompson et al. |
| 2004/0210448 | A1 | 10/2004 | Breck |
| 2004/0210449 | A1 | 10/2004 | Breck |
| 2005/0017081 | A1 | 1/2005 | Kondo et al. |

FOREIGN PATENT DOCUMENTS

| | | |
|---|---|---|
| GB | 1354978 A | 6/1974 |
| GB | 2105080 A | 3/1983 |
| JP | 58161077 A | 9/1983 |
| JP | 59148931 A | 8/1984 |
| JP | 59148932 A | 8/1984 |
| JP | 63304425 | 12/1988 |
| JP | 2121117 | 5/1990 |
| JP | 5205115 | 8/1993 |
| JP | 2001101363 | 4/2001 |
| JP | 2002024782 | 1/2002 |

OTHER PUBLICATIONS

Legon, Jeordan; "Companies aim to make paying faster, easier"; http://www.cnn.com/2002/TECH/ptech/11/26/mini.credit; Jan. 15, 2003; 3 pages.

USA: Bank of America is launching a mini bank card; http://qualisteam.com/news; Jan. 15, 2003; 1 page.

Mini Card; http://www.bankofamerica.com/creditcards/index.cfm?template=cc_features_minicard&adlin; Jan. 15, 2003; 1 page.

Multimedia Available: Mini Credit Card on KeyChain; http://money.cnn.com/services/tickerheadlines/bw/223380293.htm; Jan. 15, 2003; 2 pages.

"Dual Stripe Magnetic Card"; IBM Technical Disclosure Bulletin; May 1980; pg. 5928.

Ellen Leander, "Collegian: captive audience for smart cards?"; American Banker; Sep. 12, 1995; Copyright 2003 Gale Group.

* cited by examiner

FIG. 7
TRACK 2

SYSTEM AND METHOD FOR REDEEMING REWARDS AND INCENTIVES

REFERENCE TO CROSS-RELATED APPLICATIONS

This is a continuation-in-part application of U.S. patent application Ser. No. 10/740,707, filed Dec. 18, 2003 now U.S. Pat. No. 7,090,138.

FIELD

The present application relates to a system and method for redeeming rewards and incentives and, more particularly, to a system and method for redeeming rewards and incentives using a transaction card having at least two magnetic stripes.

BACKGROUND

Numerous financial institutions, such as credit card companies and banks, and other entities, such as airline carriers, hotels and retailers, offer membership reward programs. These programs often reward participants with reward units, such as reward points or the like, when purchasing merchandise or services from merchants using a qualified account, such as a debit or credit account. A participant may use a transaction card associated with the qualified account to conduct the respective transaction. Reward units typically accrue at a rate of one unit for every dollar spent using the credit or debit account and the accrued units operate as currency. Some entities restrict purchasing to particular merchants to earn reward units, whereas other financial institutions have no such restrictions. Additionally, reward units usually do not accumulate on cash advances, convenience checks, balance transfers, fees or adjustments. When merchandise purchased with the respective account is returned, the account credit will result in a reduction of reward units.

Participants usually seek to accumulate enough reward units to purchase merchandise or services. For instance, a participant may seek to accumulate enough reward units to purchase a particular product from an associated merchant or purchase an airline ticket from another associated merchant. Depending on the program, only certain merchants are considered qualified merchants with whom reward units can be redeemed towards a purchase.

Membership reward programs also often offer participants other rewards, incentives or the like instead of or in addition to the ability to accumulate reward units. For example, some membership reward programs return to a participant a predetermined percentage of a transaction amount or of an amount spent during a predetermined period (referred to as "cash back") either as a credit to an account or by check, offer participants discounts on select merchandise or services, and complimentary merchandise or services.

As described above, a transaction card having a magnetic stripe associated with a debit or credit account can be used by a participant to conduct a transaction and hence earn reward units and/or other rewards, incentives or the like, assuming the participant is entitled to such rewards, incentives or the like, for instance, if the participant is enrolled in a membership reward program. The accumulated rewards, incentives or the like cannot be redeemed with the transaction card, as the transaction card only has one magnetic stripe associated with a credit or debit account. Instead, other known methods for redemption are utilized by participants.

Transaction cards having more than one magnetic stripe are known in the art. However, the magnetic stripes are operable, for example, for access to separate debit accounts having funds deposited therein and accounts having credit lines associated therewith and are operable, for example, to separate transactions at the point-of-sale, such as business expenses and personal expenses.

A need, however, exists for a system and method that enables a cardholder to accumulate rewards, incentives or the like and to redeem at least a portion of those rewards, incentives or the like using a particular dedicated magnetic stripe located on a transaction card having at least one other magnetic stripe.

SUMMARY

An aspect of the present application provides for a method for processing a transaction initiated by an individual with a merchant using a transaction card having at least two magnetic stripes, the method comprising receiving information associated with the transaction, the information including account information and transaction information including a purchase amount, determining according to the received information whether a first magnetic stripe or a second magnetic stripe was read at the merchant, the first magnetic stripe being associated with a financial account and the second magnetic stripe being associated with a rewards account, converting the purchase amount to an amount of reward units, when it is determined that the second magnetic stripe was read at the merchant, determining whether the rewards account has a balance of reward units at least equal to the amount of converted reward units, authorizing the transaction if the balance of the rewards account is at least equal to the amount of converted reward units, and decreasing the balance of the rewards account by at least the amount of converted reward units.

BRIEF DESCRIPTION OF THE DRAWINGS

The present application can be more fully understood by reading the following detailed description of the presently preferred embodiments together with the accompanying drawings, in which like reference indicators are used to designate like elements, and in which.

DETAILED DESCRIPTION

Figure 1:
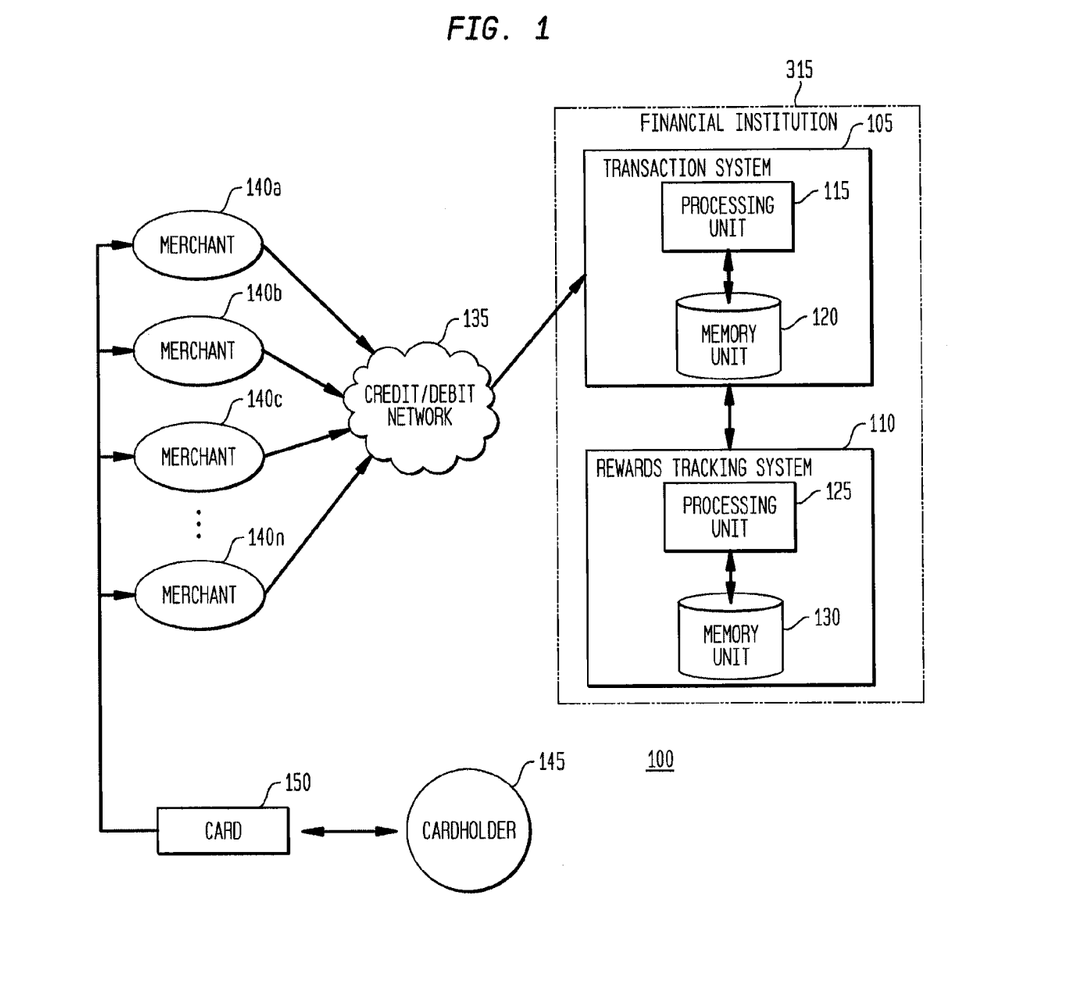
FIG. 1 illustrates an exemplary reward accumulation and redemption system according to the exemplary embodiments of the present application.
Figure 2:
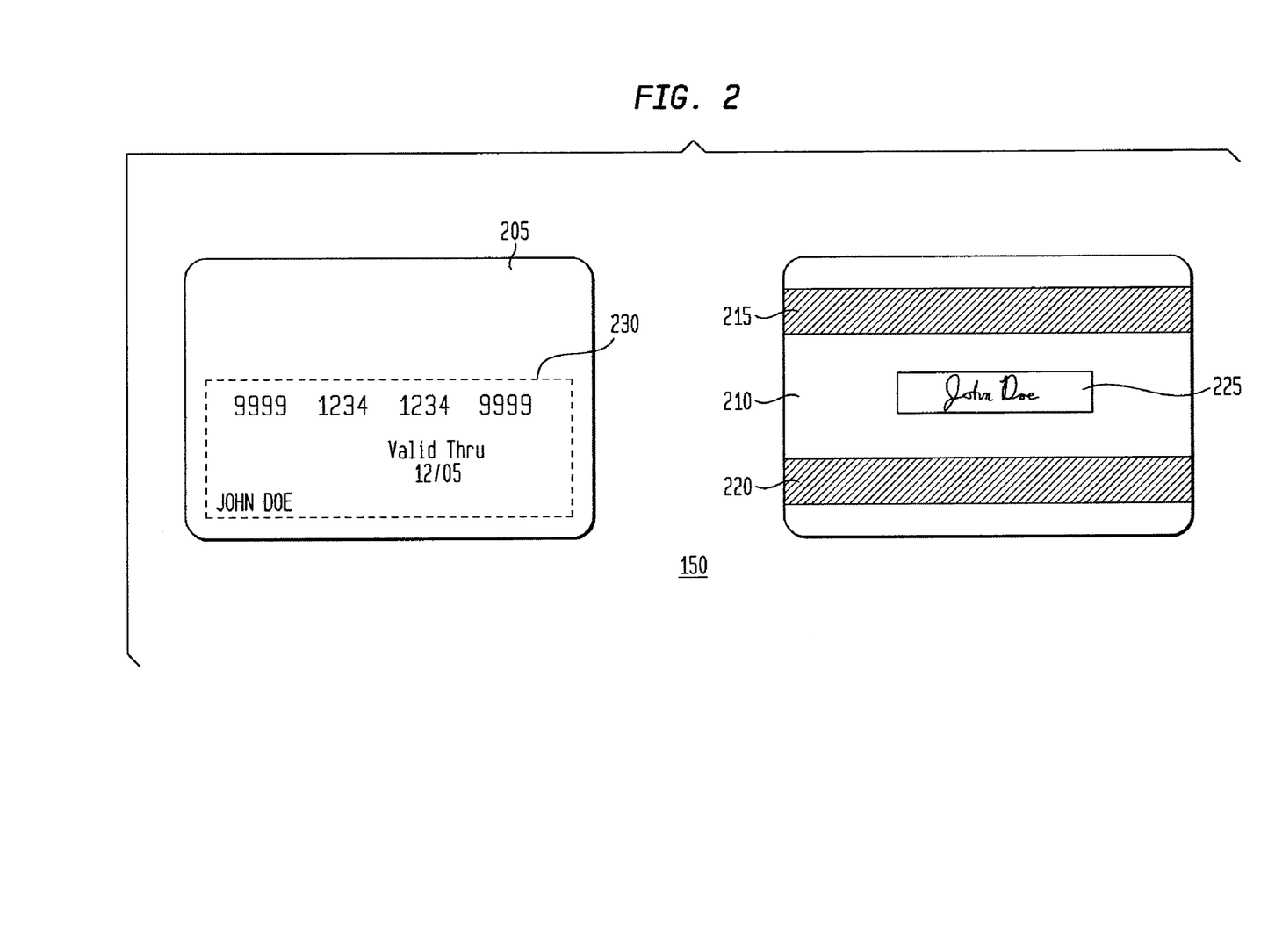
FIG. 2 illustrates an exemplary transaction card used with the exemplary system shown in FIG. 1.

FIG. 1 depicts an exemplary reward accumulation and redemption system 100. Reward accumulation and redemption system 100 enables a participant in a reward program (hereinafter referred to as "cardholder 145") to earn rewards, incentives or the like, for instance, by engaging in transactions with merchants using a transaction card associated with a qualified financial account, and later redeeming those accumulated rewards, incentives or the like using the same transaction card with those merchants or with other merchants. An exemplary transaction card of the present application, transaction card 150, includes at least two magnetic stripes, as illustrated in FIGS. 2, 3 and 4 and described herein.

Figure 3:
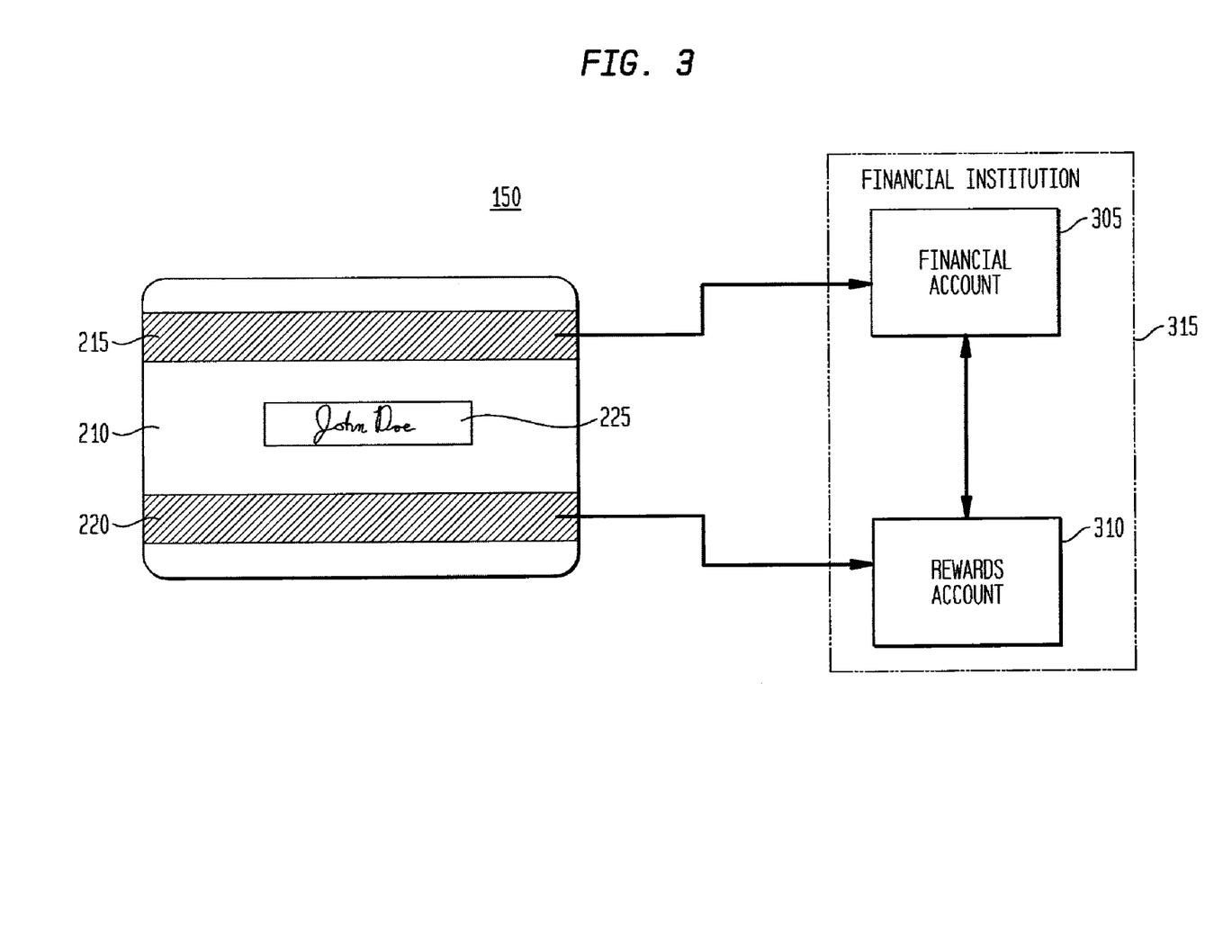
FIG. 3 illustrates the exemplary transaction card shown in FIG. 2 and exemplary accounts associated with respective magnetic stripes.
Figure 4:
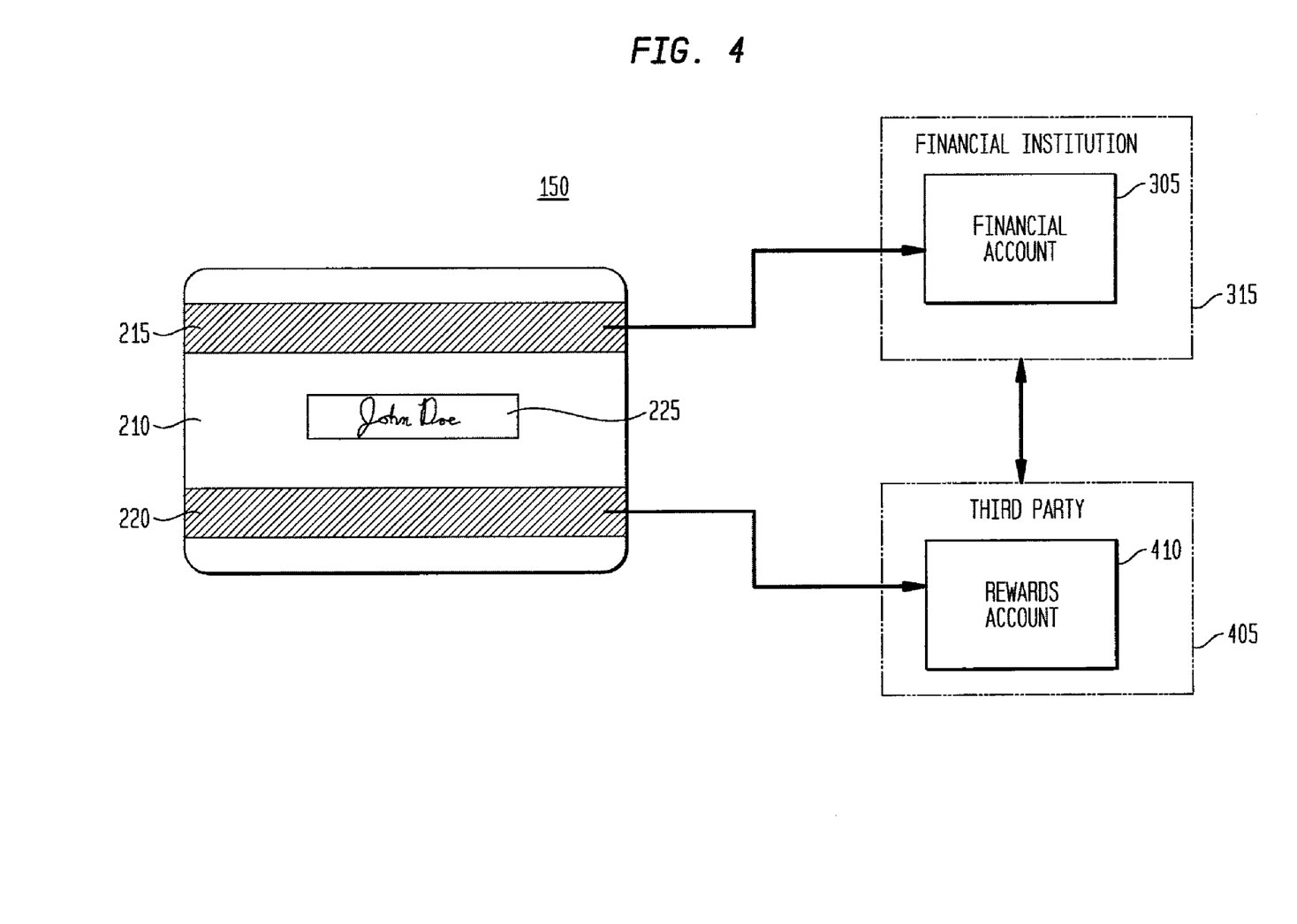
FIG. 4 illustrates the exemplary transaction card shown in FIG. 2 and exemplary accounts associated with respective magnetic stripes.

In an exemplary embodiment of the present application, cardholder 145 has the ability to earn a plurality of reward units, such as points, for example, for purchases with merchants 140a . . . 140n using qualified financial account 305, such as a credit or debit account, shown in FIGS. 3 and 4, as described herein.

The present application is applicable to any institution or company having a membership reward program associated therewith, including financial institutions, airlines, supermarkets, hotels, car rental companies, retail stores, Internet loyalty programs, loyalty providers, such as Carlson Companies, Inc. and Cendant Corporation, and Visa® and MasterCard® that offer rewards, incentives or the like. In an exemplary embodiment of the present application, the membership reward program is managed directly by the institution or company, for instance, financial institution 315, as seen in FIG. 3. Alternatively, the membership reward program is managed by a third party, for instance, third party 405 associated with financial institution 315, as depicted in FIG. 4. Financial institution 315 may or may not in a partnership with third party 405 and/or other party. For instance, in the event financial institution 315 has a partnership relationship with third party 405 and/or other party, the relationship may involve a co-branding.

The membership reward program can also be operable as an independent reward program, as an accelerator reward program, as a coalition reward program or otherwise, or as a combination thereof. As would be appreciated by a person having ordinary skill in the art, when enrolled in an accelerator program, a participant accelerates the earning of reward units or the like in another reward program independent of the accelerator program, for example, when conducting transactions with an account linked to the accelerator program. A coalition reward program, such as Upromise (www.upromise.com), is operable for participants to earn rewards from a particular suite of merchants. Other reward programs can be associated with the coalition reward program. When a participant conducts a transaction with one of the merchants within the suite using one of these other reward programs, that participant earns additional rewards. For instance, a reward program associated with a coalition reward program is operable for participants to earn X % for every transaction regardless of the merchant and an additional Y % for transactions conducted with one of the merchants within the suite and an additional Z % at another one of the merchants within the suite.

Accordingly, two or more membership reward programs can be linked together so that a participant earns reward units or the like in a single rewards account 310, 410 from various sources.

Commencement of participation and/or maintenance of an active status in the membership reward program of the present application may require an initialization and/or activation procedure to be performed by the cardholder 145. Additionally, participation in the reward program may be terminated through utilization of a deactivation procedure by the cardholder 145. The activation and/or deactivation of the reward program may relate, for example, to the membership reward program managed by the financial institution 315 or to the membership reward program managed by the third party 405.

In an exemplary embodiment, for example, the activation and/or deactivation procedure may be performed by telephonic communication with a representative, by electronic email, by utilization of an interface located on an electronic communication network such as the Internet, via postal mail, and the like. Additionally, the activation and/or deactivation procedure may be performed via the credit/debit network 135. The activation and/or deactivation procedure may relate to accounts associated with one or both of the conventional magnetic stripe 215 and the reward magnetic stripe 220, described in greater detail below. Additionally, the activation and/or deactivation procedure may relate to accounts associated with financial institution 315 and/or third party 405.

The activation and/or deactivation procedures may be applicable to one or more of financial account 305, rewards account 310, and rewards account 410. In an exemplary embodiment, an activation or deactivation procedure performed with respect to financial account 305 may automatically be performed for corresponding rewards accounts, for instance, rewards account 310 or rewards account 410. Likewise, an activation or deactivation procedure performed with respect to rewards account 310 or rewards account 410 may automatically be performed for financial account 305. The activation and/or deactivation procedures may be performed any number of times, allowing the cardholder 145 to effectively activate and/or deactivate one or more of financial account 305, rewards account 310, and rewards account 410 when desired.

In an exemplary embodiment, multiple transaction cards 150 may be associated with a single set of financial and/or reward accounts, for example, financial account 305, reward account 310, and/or reward account 410. Accordingly, the activation and/or deactivation procedure may be performed with respect to one or more of the plurality of transaction cards 150. For instance, a number of individuals may have transaction cards 150 associated with a common set of accounts, and any of the transaction cards 150 and/or either of the conventional magnetic stripe 215 and the reward magnetic stripe 220 may be activated or deactivated individually. As with respect to the financial account 305, rewards account 310, and rewards account 410, the activation and/or deactivation procedures relating to the any of the transaction cards 150 and/or either of the conventional magnetic stripe 215 and the reward magnetic stripe 220 may be performed any number of times, allowing the cardholder 145 to activate and/or deactivate any of the transaction cards and/or the magnetic stripes when desired.

Reward system 100 includes exemplary transaction system 105 and exemplary rewards tracking system 110. Transaction system 105 is linked to a plurality of merchants 140a . . . 140n via credit/debit network 135. Transaction system 105 includes processing unit 115 and memory unit 120 coupled to processing unit 115, processing unit 115 managing and recording data associated with transactions between cardholder 145 and merchants 140a . . . 140n. Memory unit 120 is operable for storing personal information pertaining to each participant, including cardholder 145, and account data pertaining to the respective participants, for example, account number(s) and transaction data. Memory unit 120 can include various types of memory storage devices, for example, one or more databases, relational or otherwise and, therefore, is not meant to be limited to any particular type of storage device.

Rewards tracking system 110 is linked to transaction system 105 and includes processing unit 125 coupled to memory unit 130. Rewards tracking system 110 can either be associated with the reward program offered, for example, by financial institution 315, associated with a third party, such as third party 405, having reward managing responsibilities for reward accumulation and/or reward redemption, or responsibilities can be shared between the respective parties. Processing unit 125 is operable for managing reward accrual and redemption, and memory unit 130 is operable for storing data regarding reward accrual and reward redemption for each respective participant including cardholder 145. Memory unit 130 can include various types of memory storage devices, for example, one or more databases, relational or otherwise and, therefore, is not meant to be limited to any particular type of storage device.

In an exemplary embodiment, memory unit 130 and memory unit 120 are relational databases so that data can be stored in both memory units 130, 120 for cardholder 145. Alternatively, either memory unit 130 or memory unit 120 is included in reward system 100 and can be included in rewards tracking system 110, transaction system 105, or elsewhere. Similarly, either processing unit 115 or processing unit 125 can be included in reward system 100 and can be included in rewards tracking system 110, transaction system 105, or elsewhere. The functionality provided by reward tracking system 110 and transaction system 105 can also be provided by a single system, as opposed to separate systems linked together, such as rewards tracking system 110 and transaction system 105.

Transactions and prospective transactions between cardholder 145 and merchants 140a . . . 140n are processed by processing unit 115 via credit/debit network 135. For instance, credit/debit network 135 could be the MasterCard®/Visa® network or other proprietary networks, such as Plus, Novus (debit), Diner's Club® (credit) and American Express®, the operation and use of which are well known in the art and are, thus, not described herein. Transactions between cardholder 145 and merchants 140a . . . 140n can be initiated at a point-of-sale ("POS") terminal, through an Internet link, through a mail link or through a telephone link.

The processing of transactions and prospective transactions may be performed using an electronic funds transfer system such as the Automated Clearing House Network ("ACH"), and ACH transfers may be used to transfer funds to or from accounts and may be incorporated within the credit/debit network 135 or may be independent of credit/debit network 135. The present application is not limited to using an ACH network and/or a credit/debit network to transfer funds to or from accounts. Rather, funds can be transferred to or from accounts in any manner. Exemplary communication links for transferring funds to or from accounts include wiring, electronic funds transfer, ATM networks, Visa®, MasterCard®, Plus, Novus, Diner's Club®, American Express®, and the like.

In an exemplary embodiment, cardholder 145 purchases with qualified financial account 305 merchandise and services from or through any of the plurality of merchants 140a . . . 140n and earns rewards, incentives or the like, such as reward units, on those purchases since financial account 305 is associated with the reward program. The accumulated rewards, incentives or the like are reflected in rewards account 310, 410. Cardholder 145, however, can only use those earned reward units with those merchants, referred to hereinafter as qualified merchants, amongst merchants 140a . . . 140n that have a preexisting business arrangement with the reward program associated with financial account 305. Cardholder 145 is not restricted as to which of the plurality of merchants 140a . . . 140n, qualified or non-qualified, they can make purchases from or through. Furthermore, depending on the reward program, cardholder 145 may be able to redeem reward units for gift certificates, cash or the like and, therefore, have the ability to make purchases from any merchant amongst the plurality of merchants 140a . . . 140n, assuming the respective merchant accepts such gift certificates, cash or the like. As will be appreciated by a person having ordinary skill in the art, the present application is not limited to redemption within credit/debit network 135.

Alternatively, cardholder 145 can use those earned reward units or other rewards, incentives or the like, with any one of the merchants 140a . . . 140n regardless of whether the respective merchant has a preexisting business arrangement with the reward program associated with financial account 305. Hence, the respective merchant processes the transaction using, for instance, the earned reward units as currency without being aware that a form of payment was used other than a cash reserve or a credit line.

The exemplary embodiments of the present application are described herein with reference to reward units as being points, and earning and redeeming the same. The present application, however, is not limited to points, as points are units merely symbolizing a form of currency for use towards transactions. Hence, other symbols operable as currency are equally applicable to the exemplary embodiments of the present application, for instance, miles, stars, dollars, cash, rebates or credits.

Further, the exemplary embodiments of the present application are described herein with reference to participants such as cardholder 145. Participants are individuals that have enrolled, for instance, in the membership reward program and therefore are entitled to earn and redeem points. Even though the exemplary embodiments are described herein with reference to such participants having membership in a reward program, alternatively, membership in a particular program is not a prerequisite for earning and redeeming rewards, incentives or the like.

The components of FIG. 1 may be implemented through hardware, software, and/or firmware. The components in reward system 100 are not limited to those illustrated.

Exemplary transaction card 150 is depicted in more detail in FIG. 2. Transaction card 150 includes front face 205 and back face 210. Transaction card 150 is a conventional transaction card except transaction card 150 includes conventional magnetic stripe 215 and an additional magnetic stripe—reward magnetic stripe 220 on back face 210. Reward magnetic stripe 220 is located along the bottom, horizontal side edge of transaction card 150, as can be seen in FIG. 2. Alternatively, the location of conventional magnetic stripe 215 and reward magnetic stripe 220 can be reversed from what is illustrated in FIG. 2. Reward magnetic stripe 220 may also be located along either a vertical or horizontal edge of front face 205 or along a vertical edge of back face 210. The present application is not limited to any particular orientation and location of conventional magnetic stripe 215 and reward magnetic stripe 220.

Figure 6:
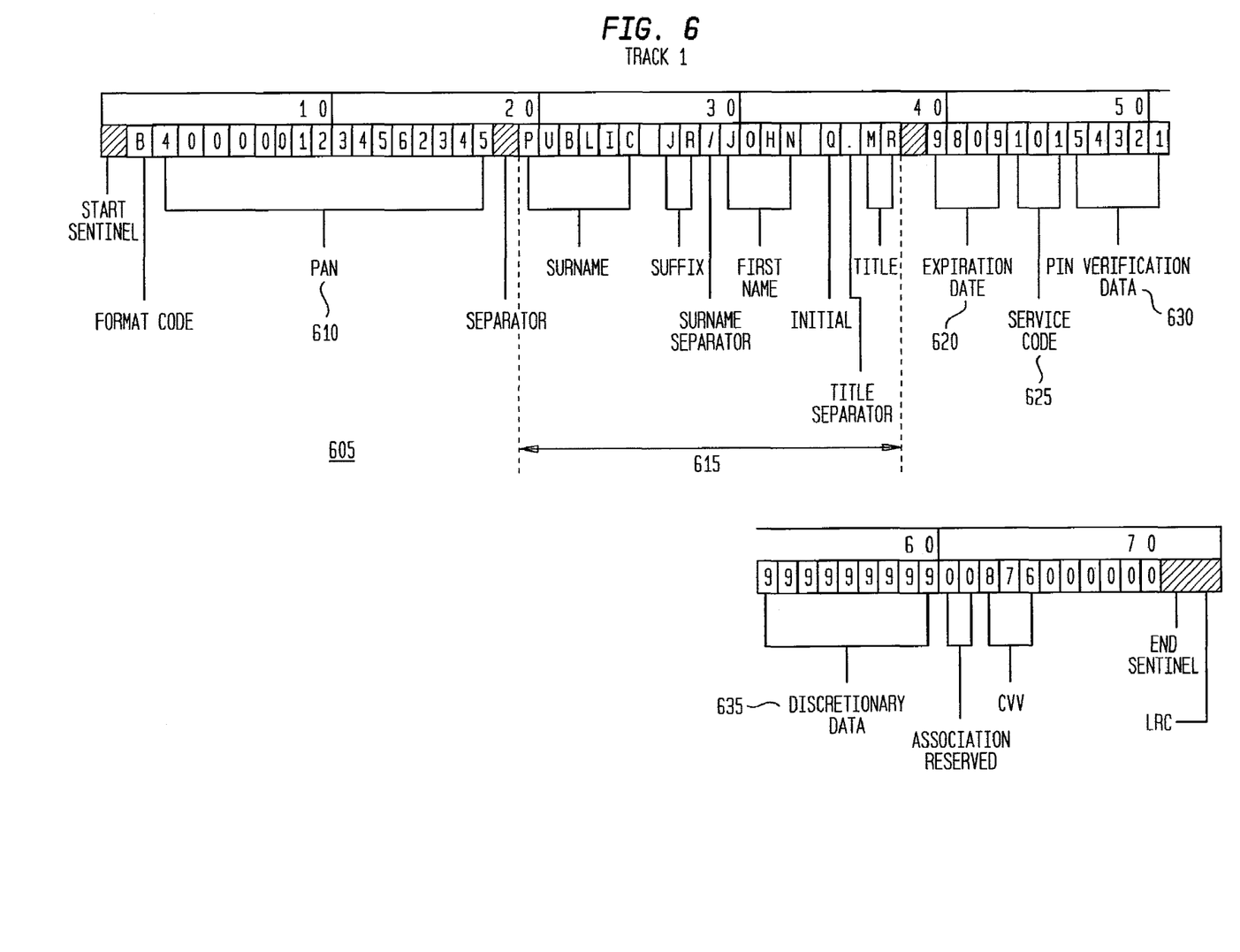
FIG. 6 illustrates exemplary data fields associated with track 1 of a magnetic stripe.
Figure 7:
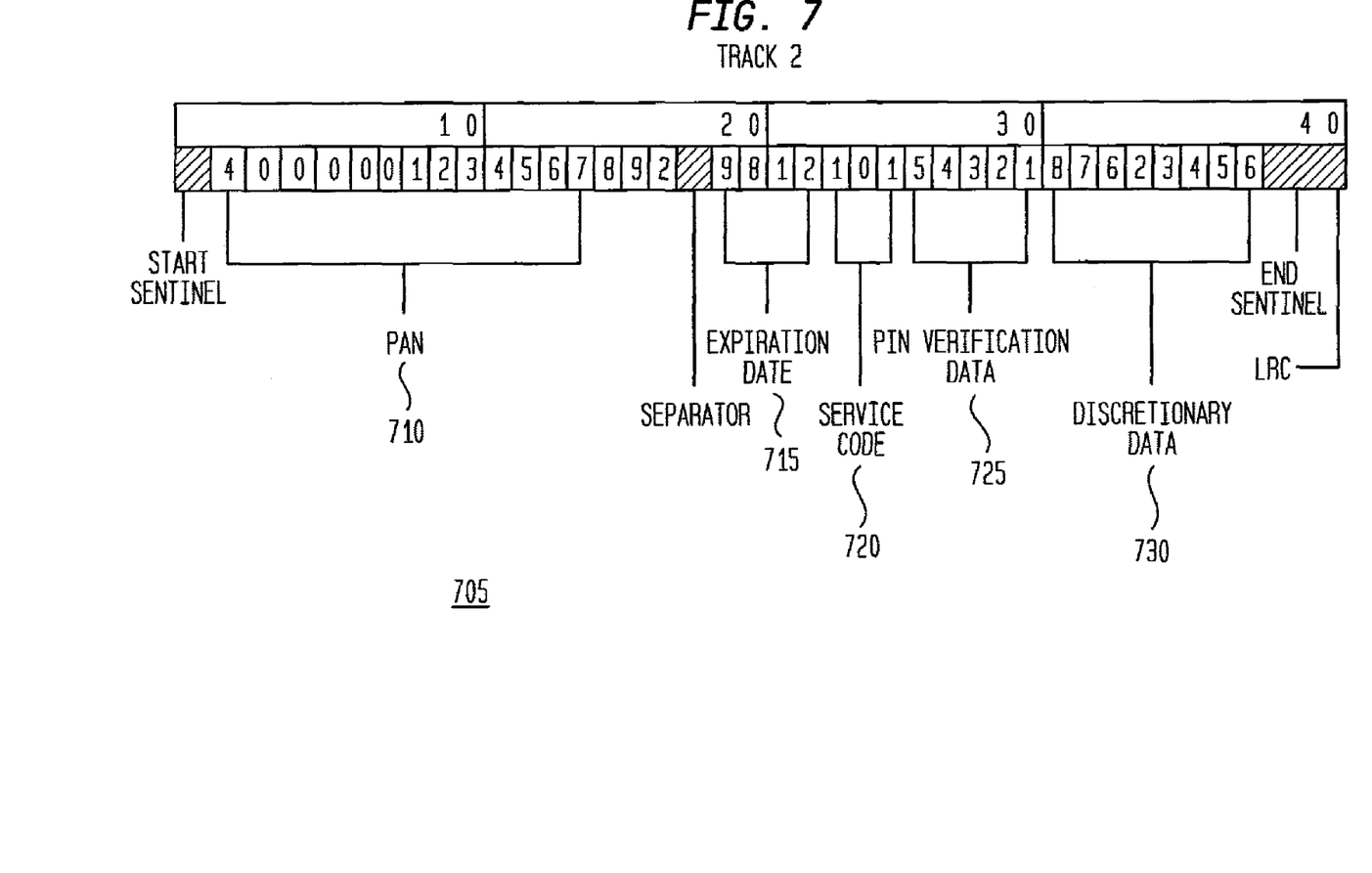
FIG. 7 illustrates exemplary data fields associated with track 2 of the magnetic stripe.

As will be appreciated by a person having ordinary skill in the art, conventional magnetic stripe 215 and reward magnetic stripe 220 each include at least one track having a plurality of data fields. FIGS. 6 and 7 illustrate two tracks associated with each magnetic stripe. Specifically, FIG. 6 illustrates exemplary data fields associated with track 1 605 of conventional magnetic stripe 215 and reward magnetic stripe 220 and FIG. 7 illustrates exemplary data fields associated with track 2 705 of conventional magnetic stripe 215 and reward magnetic stripe 220, track 1 605 and track 2 705 having exemplary data encoded thereon for illustration purposes. Alternatively, conventional magnetic stripe 215 and/or reward magnetic stripe 220 can have one track or can have more than two tracks. As will also be appreciated by a person having ordinary skill in the art, a magnetic stripe often has multiple tracks encoded with the same or similar data because different devices, such as POS terminals, automated teller machines or the like, may read different tracks. One of the multiple tracks may also be left empty—not encoded with any data. The exemplary embodiments of the present application, however, are equally applicable to a magnetic stripe having one track.

The data fields of track 1 605 are encoded with data indicating, for instance, account number 610, card holder's name 615, expiration date 620, service code 625 and PIN verification (optional) 630, as depicted in FIG. 6. Track 1 605 also includes a discretionary data field 635, an operation of which is described herein. The data fields of track 2 705 are encoded with data indicating, for instance, account number 710, expiration date 715, service code 720 and PIN verification (optional) 725, as illustrated in FIG. 7. Track 2 705 also includes a discretionary data field 730, an operation of which is described herein. The present application is not limited to the data fields shown in FIGS. 6 and 7. For instance, additional data fields can be included, the size of a respective data field can be different and the ordering of the data fields in a respective track can be different.

Transaction card 150 also includes indicia 230 on front face 205, indicia 230 being, for example, an account number, an expiration date and the name of cardholder 145. Besides conventional magnetic stripe 215 and reward magnetic stripe 220, back face 210 includes signature box 225. Front face 205 and rear face 210 can include various other information in addition to or in place of indicia 230 and signature box 225. In an alternative embodiment of the present application, front face 205 includes another set of indicia such that indicia 230 corresponds to financial account 305 and the other set of indicia corresponds to rewards account 310,410, or vice versa. The present application is not limited to any particular orientation or location of indicia associated with either conventional magnetic stripe 215 or reward magnetic stripe 220.

FIG. 3 illustrates exemplary accounts accessible when using conventional magnetic stripe 215 and reward magnetic stripe 220. For instance, conventional magnetic stripe 215 is operable for accessing financial account 305 managed by financial institution 315. As described herein, financial account 305 can be a credit account, a debit account such as a checking account, savings account, a money market account or the like, a college fund account, a stored value account, or the like. For instance, financial account 305 may include one of a mortgage account, a brokerage account, a medical account, a transportation account, or a home equity line of credit account.

Reward magnetic stripe 220 is operable for accessing rewards account 310 also managed by financial institution 315. In an exemplary embodiment, rewards account 310 has a balance equal to a number of accumulated reward units, for example, points.

Alternatively, reward magnetic stripe 220 can be operable for accessing rewards account 410 managed by third party 405, as shown in FIG. 4. Third party 405 is linked to financial institution 315. As a result, data regarding the membership reward program managed by third party 405 is accessible to financial institution 315 so that financial institution 315 can accept or decline attempted transactions by cardholder 145, as described herein or third party 405 can accept or decline attempted transactions and transmit data indicating such a determination to financial institution 315.

The one or more accounts associated with the respective magnetic stripes may be changed at any time. In an exemplary embodiment, for instance, the financial account 305 associated with conventional magnetic stripe 215 may be substituted for another financial account managed by financial institution 315 or by another entity. Likewise, rewards account 310 and/or rewards account 410 associated with reward magnetic stripe 220 may be substituted for another rewards account managed by financial institution 315, third party 405, or another entity. The substitution of the financial account 305, rewards account 310, and/or rewards account 410 may be performed via the credit/debit network 135, or via an ACH network, an electronic funds transfer network, an ATM network, a Visa® network, a MasterCard® network, a Plus network, a Novus network, a Diner's Club® network, an American Express® network, and the like. The substitution of the financial account 305, rewards account 310, and/or rewards account 410 may additionally be performed via telephonic communication with a representative, via electronic mail, via an electronic interface located on a communications network such as the Internet, by postal mail, and the like. The substitution may be temporary or may be for an indefinite period of time, and may be performed prior to or subsequent to performance of the transaction.

Figure 5:
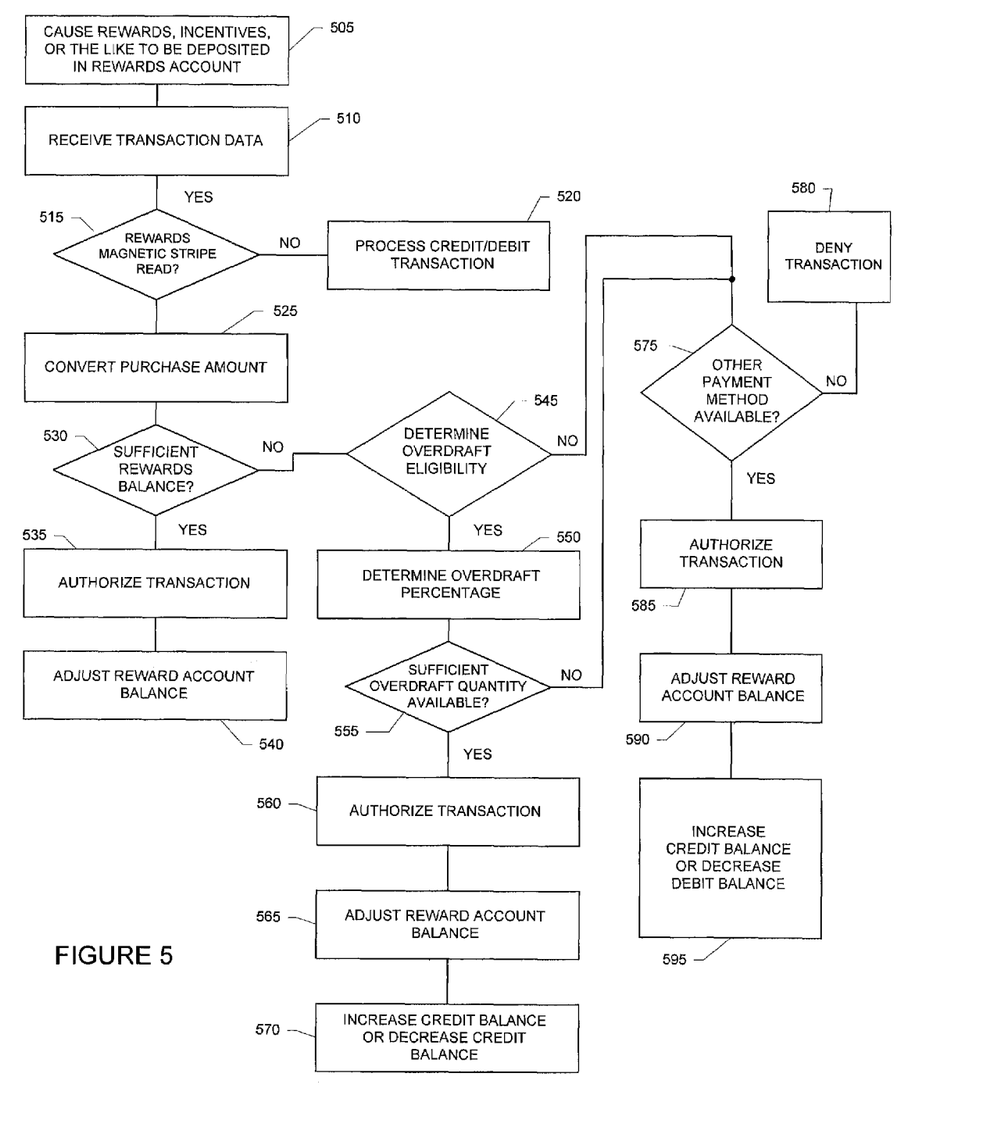
FIG. 5 illustrates an exemplary flow diagram for accumulating and redeeming rewards, incentives or the like according to the exemplary embodiments of the present application.

FIG. 5 illustrates an exemplary flow chart for accumulating and redeeming rewards, incentives or the like according to the exemplary embodiments of the present application. As points are accumulated by cardholder 145, the respective points are thereafter deposited in rewards account 310 (and/or rewards account 410), in 505. That is, the balance of rewards account 310 is increased according to a value attributed to the accumulated points. Points can be earned based on purchases with or without using transaction card 150, promotions, bonuses, incentives, points savings such as interest on points, redemption behavior or the like.

Transaction card 150 is presented by cardholder 145 to one of the plurality of merchants 140*a* . . . 140*n*, for instance, at a POS terminal. The POS terminal or other device, alone or in combination with one or more additional devices, reads data stored in the plurality of data fields of either conventional magnetic stripe 215 or reward magnetic stripe 220 depending on which magnetic stripe was read. Each time transaction card 150 is read at one of the plurality of merchants 140*a* . . . 140*n*, the respective one of the plurality of merchants 140*a* . . . 140*n* transmits transaction data to processing unit 115 and processing unit 115 in turn receives the respective transaction data which includes at least a portion of the data read from the plurality of data fields via credit/debit network 135, in 510. Based on an evaluation of the received transaction data, processing unit 115 determines whether reward magnetic stripe 220 or conventional magnetic stripe 215 was read at merchant 140*a* . . . 140*n*, in 515.

In an exemplary embodiment, processing unit 115 determines whether reward magnetic stripe 220 or conventional magnetic stripe 215 was read at merchants 140*a* . . . 140*n* by examining data stored in at least one predetermined data field of the respective magnetic stripe, for example, discretionary data stored in discretionary data fields 635, 730 shown in FIGS. 6 and 7, respectively. For instance, the predetermined data field(s) of the reward magnetic stripe 220 includes data, whereas the corresponding data field of the conventional magnetic stripe 215 does not contain any data. Hence, processing unit 115 determines that reward magnetic stripe 220 was read by the presence of data in the at least one predetermined data field. Alternatively, the predetermined data field(s) of the conventional magnetic stripe 215 and the corresponding data field(s) of the reward magnetic stripe 220 contain different data. As a result, processing unit 115 determines whether reward magnetic stripe 220 or conventional magnetic stripe 215 was read at merchants 140*a* . . . 140*n* by examining the content of the respective data fields.

In an exemplary embodiment, the same data is encoded in track 1 605 and track 2 705 of reward magnetic stripe 220 since different POS terminals or other devices may read different tracks of reward magnetic stripe 705. Some POS terminals or other devices may even read both tracks. Alternatively, track 1 605 and track 2 705 are not encoded with any data.

As will be appreciated by a person having ordinary skill in the art, the present application is not limited to the above-described manners of determining which magnetic stripe was read at one of the plurality of merchants 140*a* . . . 140*n*. Other manners can be used instead of or in addition to the manners described herein that are within the scope of the present application. In an exemplary embodiment, data is stored in the predetermined data field(s) at the time one or more of the other data fields is coded with data, such as account data.

If processing unit 115 determines that conventional magnetic stripe 215 was read at merchant 140*a* . . . 140*n*, then at least a portion of the transaction data indicating the account number is used by processing unit 115 to process the transaction initiated by cardholder 145 in a conventional manner for processing credit or debit transactions which are well known to a person having ordinary skill in the art, in 520. Further, in an exemplary embodiment, assuming the transaction is authorized, at least a portion of the received transaction data is transmitted to rewards tracking system 110 so that the respective amount of reward units (points) earned based on the amount of the transaction is deposited in rewards account 310, 410.

If processing unit 115 determines, however, that reward magnetic stripe 220 was read at merchant 140*a* . . . 140*n*, then at least a portion of the received transaction data and/or other data is transmitted to processing unit 125 of rewards tracking system 110, that data indicating at least the monetary value of the attempted transaction by cardholder 145, referred to hereinafter as the purchase amount data. In an exemplary embodiment, processing unit 125 of rewards tracking system 110 converts the purchase amount data into at least a portion of a reward unit (point) using a predetermined computation, for instance, every dollar equals X reward unit(s), in 525.

Additionally, performance of the processing may include entry of at least one personal identification number ("PIN"). The at least one PIN may include any quantity and/or combination of numeric or alphanumeric characters, and may be selected by the individual at a time prior to the transaction. The PIN may be associated with one or both of reward magnetic stripe 220 or conventional magnetic stripe 215. In an exemplary embodiment, the cardholder 145 may be prompted to enter a PIN at the time of presentation of the transaction card 150, and entry of the PIN may be performed via the POS. Prompting the cardholder 145 for entry of the at least one PIN may occur before or after reading of the transaction card 150 by the POS. The at least one PIN entered may be processed by the POS to compare it with, for example, information contained in the data fields of the tracks stored in the reward magnetic stripe 220 and/or the conventional magnetic stripe 215. Alternatively, the at least one PIN entered may be transmitted to and processed by financial institution 315 and/or third party 405, and compared to stored PIN information. Entry of the at least one PIN may be required to allow performance of the transaction, and the PIN may be required for utilization of one or both of the reward magnetic stripe 220 or the conventional magnetic stripe 215. For example, requesting cardholder 145 to enter a PIN when reward magnetic stripe 220 may prevent the associated account from being accessed fraudulently or inadvertently.

Next, processing unit 125 retrieves data stored in memory unit 130 indicating the balance of rewards account 310, 410. Processing unit 125 then determines whether the balance of rewards account 310, 410 is equal to or greater than the amount of points representing the converted purchase amount, in 530. If it is determined that the balance is equal to or greater than the converted purchase amount, then processing unit 125 transmits data to processing unit 115 indicating transaction authorization and processing unit 115 in turn transmits data indicating transaction authorization to the respective one of the plurality of merchants 140*a* . . . 140*n*, in 535. Processing unit 115 and/or processing unit 125 then adjusts the balance of reward account 310, 410 to reflect the converted amount which data is stored in memory unit 130, in 540. For example, the balance of reward account 310, 410 is decreased by an amount equal to the amount of points representing the purchase amount.

Overdraft protection may also be included in the reward system of the present application. For example, in an exemplary embodiment, processing unit 115 and/or processing unit 125 may subtract the converted purchase amount from the balance of the reward account 310 or the reward account 410. When processing unit 115 and/or processing unit 125 determines that the balance of reward account 310 and/or reward account 410 is less than the converted purchase amount, then processing unit 115 and/or processing unit 125 determines whether one or more associated accounts are eligible for overdraft at 545. The one or more other associated accounts may include financial account 305, and may be associated with reward account 310 and/or reward account 410. The one or more associated accounts may be selected by the cardholder 145, and may be accessed in accordance with a set of predetermined logic to fund transactions and/or to adjust account balances.

In an exemplary embodiment, for example, the determination of overdraft eligibility may include determining whether the financial account 305 and/or reward account 310 or reward account 410 have been designated as overdraft funding source accounts by the cardholder 145, the financial institution 315, or the third party 405, at 545. When it is determined that financial account 305 and/or reward account 310 or reward account 410 have been designated as overdraft funding source accounts, an overdraft percentage may be determined at 550.

The overdraft percentage may be defined and/or adjusted at any time by the cardholder 145, the financial institution 315, or the third party 405, and may be a percentage of a balance of the respective account that may be accessed to fund the transaction. Alternatively, the financial institution 315 or the third party 405 may adjust the overdraft percentage, for example based upon transaction activity of the cardholder, a date of the transaction, a credit rating and/or FICO score associated with the cardholder 145, quantities of account balances associated with the cardholder 145, and the like. The overdraft percentage may be defined, for example, as a portion of the respective account expressed as a percentage of the account balance, and may include reward units or a cash value associated with reward units. Alternatively, the overdraft percentage may be defined as a predetermined quantity of cash and/or credit, a predetermined quantity of reward points, and/or a quantity of reward points equivalent to a predetermined cash value.

In an exemplary embodiment, for instance, the cardholder 145 may define the overdraft percentage as 20% of the balance of the financial account 305, to enable 20% of the funds held in the financial account 305 to be available as overdraft funds to fund transactions. The overdraft percentage may be defined as any percentage of the one or more associated accounts, and the overdraft percentage may be modified at any time, for example by the cardholder 145 or by the financial institution 315. The modification may be performed through, for example, telephonic communication with a representative of the financial institution 315 and/or third party 405, by accessing a software application via a communication network such as the Internet, by facsimile communication, by email communication, by SMS communication, by postal mail communication, and the like.

The overdraft percentage may be used to determine an available overdraft quantity, for example by multiplying the overdraft percentage by a balance of the respective associated account. The available overdraft quantity may be compared with the quantity by which the converted purchase amount is greater than the balance of the reward account 310 or reward account 410, at 555. When the associated account contains at least an amount equal to the quantity by which the converted purchase amount is greater than the balance of the reward account 310 or reward account 410, the transaction may be authorized, at 560. When the one or more associated accounts have a sufficient open credit line and/or balance, then processing unit 115 or processing unit 125 may transmit data indicating transaction authorization to the respective one of the plurality of merchants 140a . . . 140n, in 560. Processing unit 115 and/or processing unit 125 may then adjust the balance of the one or more associated accounts in 565, for example by increasing a credit balance and/or decreasing a debit balance, depending upon the type of associated account the overdraft is associated with. When the associated account has both a credit line and cash, then both the credit line and the cash may be used to fund the purchase amount when necessary. The processing unit 115 and/or processing unit 125 may then adjust the balance of the reward account 310 and/or reward account 410 to reflect the purchase amount, in 570. For example, the balance of reward account 310 or reward account 410 may be decreased to zero or negative reward units predetermined by one or more business rules.

When it is determined at 545 that the one or more associated accounts, for instance financial account 305 and/or reward account 310 or reward account 410, have not been designated as overdraft funding source accounts, the processing may proceed to determine whether an other payment method is available at 575. That is, since a determination was made that the associated account does not contain at least an amount equal to the quantity by which the converted purchase amount is greater than the balance of the reward account 310 or reward account 410, the processing may proceed to determine whether an other payment method is available at 575. For example, if processing unit 125 determines that the balance of reward account 310, 410 is less than the converted purchase amount, then processing unit 125 and/or processing unit 115 determines whether at least one other payment method is available to cover at least a portion of the transaction amount, for instance, whether cardholder 145 has an associated credit account and/or an associated debit account that has a sufficient credit line and/or cash, respectively, in 575. In an exemplary embodiment, the associated credit account and/or the associated debit account is financial account 305. As will be appreciated by a person having ordinary skill in the art, data regarding accounts other than or in addition to financial account 305 can be retrieved and evaluated by processing unit 115 and/or processing unit 125 for determining whether a sufficient credit line and/or cash is available.

In an exemplary embodiment, in order to determine whether at least one other payment method is available, processing unit 115 and/or processing unit 125 determines the difference between the balance of reward account 310, 410 and the converted purchase amount (referred to hereinafter as the "difference amount"). After determining the difference amount, processing unit 115 and/or processing unit 125 determines whether financial account 305 has an open credit line and/or cash that is greater than or equal to the difference amount, for example, upon retrieving data stored in memory unit 120. If financial account 305 has a sufficient open credit line and/or balance, then processing unit 115 transmits data indicating transaction authorization to the respective one of the plurality of merchants 140a . . . 140n, in 585. Processing unit 115 and/or processing unit 125 then adjusts the balance of reward account 310 to reflect the purchase amount, in 590. For example, the balance of reward account 310, 410 is decreased to zero or negative reward units predetermined by one or more business rules. The difference amount is credited or debited from financial account 305 depending on whether a credit line or cash, respectively, was used to fund part or all of the purchase amount, in 595. If financial account 305 has both a credit line and cash, then both can be used if need be in order to fund the purchase amount.

If financial account 305 does not have a sufficient open credit line and/or cash, processing unit 115 searches for other accounts associated with cardholder 145 and if one or more such accounts are located, data regarding the account(s) is retrieved from memory unit 120 for locating another potential source for funding the difference amount. If no such account is located by processing unit 115 or if one or more accounts are located but do not have a sufficient credit line or cash, alone or in combination, processing unit 115 transmits data indicating that the transaction has been denied to the respective one of the plurality of merchants 140a . . . 140n, in 580.

On the other hand, if one or more other accounts are located by processing unit 115, processing unit 115 transmits data to the respective one of the plurality of merchants 140a . . . 140n indicating approval of the transaction, in 585. Depending on the purchase amount, the balance of the reward account balance is decreased, for example, to zero or negative reward units, in 590. Further, the credit line and/or cash of the one or more other accounts, for instance, financial account 305, is increased and/or decreased, respectively, to fund the difference amount, 595.

Additionally, one or more associated accounts may serve as funding sources for replenishment of the reward account 310 or the reward account 410 when the balance of reward account 310 or the reward account 410 falls below a predetermined quantity. In an exemplary embodiment, for example, the associated credit account and/or associated debit account having a credit line and/or cash balance, utilized as an alternative payment source as described above, may be used to replenish the balance of the reward account 310 or the reward account 410. The account associated with the reward account 310 or the reward account 410 may be a credit account, a debit account, or a rewards account, and may be managed by financial institution 315, third party 405, or by another entity. For instance, the one or more associated accounts may be automatically debited, and a number of reward points corresponding to the debited value may be credited to the reward account 310 or the reward account 410. The replenishing may be performed by the cardholder 145 at any time, or may be performed automatically upon the decrease of the balance of the reward account 310 or the reward account 410 to a predetermined level. The automatic replenishing may involve a predetermined number of currency and/or reward units, or may be defined in terms of a percentage of a total balance of one or more of the associated accounts, the reward account 310, or the reward account 410.

In an exemplary embodiment, for example, reward points may be credited to either the reward account 310 or the reward account 410 when a balance of the respective reward account falls below a predetermined quantity. The number of reward points credited may correspond to a predetermined quantity of points, or may correspond to a predetermined currency value. Alternatively, the number of reward points credited may correspond to a predetermined percentage of a balance of either the reward account 310, the reward account 410, or one or more of the associated accounts. For instance, either the reward account 310 or the reward account 410 may be credited with a quantity of reward points corresponding to 10% of a value of a balance of one or more of the associated accounts. The crediting to the reward account 310 or the reward account 410 may be associated with a debit of a balance of the one or more associated accounts corresponding to the amount of reward points credited when the associated account is a debit account, or may be associated with an increased balance of credit when the associated account is a credit account.

Alternatively, a replenishing of reward account 310 or reward account 410 may be performed via a purchase transaction, whereby replenishment reward units, such as points, may be purchased from an entity and deposited into reward account 310 or reward account 410 at a time of transaction, for example, in a quantity corresponding to the difference amount. The entity may include the financial institution and/or the third party 405. The purchase of the replenishment reward units may be funded, for example, by utilization of the financial account 305, or by another associated account. Additional fees associated with the purchase of the replenishment reward units may be imposed, and the additional fees may be based upon the quantity of replenishment units purchased, upon a value of the transaction, upon balances of the accounts of the cardholder 145, upon a transaction history of the cardholder 145, and the like.

In an alternative exemplary embodiment, either the reward account 310 or the reward account 410 may be credited with a quantity of reward points corresponding to a predetermined percentage of a deposit and/or credit of one or more of the associated accounts. For instance, a number of reward points corresponding to a value of 10% of a quantity deposited into one or more of the associated accounts may be credited to either the reward account 310 or the reward account 410.

In an alternative exemplary embodiment, a number of reward points corresponding to a predetermined currency value deposited into one or more of the associated accounts may be credited to either the reward account 310 or the reward account 410. For instance, 20 currency units may be debited from an amount deposited into the one or more associated accounts, and a number of reward units corresponding to a value of the 20 currency units may be credited to the reward account 310 or the reward account 410.

As will be understood by one skilled in the art, the predetermined percentages described with respect to the exemplary embodiments above are merely illustrative, and any suitable percentages and/or values may be utilized. Furthermore, the cardholder 145 may adjust the respective predetermined percentages and/or values at any time, and may adjust the frequency of the crediting of the reward account 310 or the reward account 410.

The respective one of the plurality of merchants 140*a* . . . 140*n* receives transaction authorization data or transaction denial data from processing unit 115 via credit/debit network 135 and consummates or does not consummate, respectively, the transaction with cardholder 145. As will be appreciated by a person having ordinary skill in the art, regardless whether conventional magnetic stripe 215 or reward magnetic stripe 220 is read at the respective merchant 140*a* . . . 140*n*, the merchant's experience is the same and hence the use of reward magnetic stripe 220 by cardholder 145 to make a purchase and the subsequent processing is transparent to the respective merchant.

Alternatively, rewards account 310, 410 can have a balance equal to an amount of money earned from a rewards and cash back program. For example, for every predetermined amount that cardholder 145 spends using financial account 305 or for predetermined transactions whether using conventional magnetic stripe 215 or otherwise, a predetermined percentage of the amount of the purchase is deposited into rewards account 310, 410. Accounts other than account 305 can also be linked thereto so that cardholder 145 earns additional reward units or cash back. The accumulated cash in rewards account 310, 410 can be redeemed by cardholder 145 and the transaction can be processed in the same manner as described herein for redeeming points.

The present application is not limited to rewards account 310, 410 being associated with accumulated reward units and cash back. Rather, other rewards, incentives or the like can be accumulated and redeemed by using reward magnetic stripe 220 such as credits, savings, certificates, changing membership status, for example, gold membership status to platinum membership status in a tiered product and special servicing, for example, a cardholder always gets a live telephone associate or the use of a specialized rewards planner.

In an alternative embodiment of the present application, as opposed to data indicating account number(s) being stored on conventional magnetic stripe 215 and reward magnetic stripe 220, the magnetic stripes are encoded with data used by processing unit 115 to determine the respective account number, for instance, by utilizing a look-up table or the like stored in memory unit 120 and/or memory unit 130. In a further alternative embodiment of the present application, data indicating the same account number is encoded on conventional magnetic stripe 215 and reward magnetic stripe 220. However, at least one of the plurality of data fields associated with each of the magnetic stripes is encoded with data used by processing unit 115 to determine whether to access financial account 305 or rewards account 310, 410, for instance, by utilizing a look-up table or the like stored in memory unit 120 and/or memory unit 130.

Statements may be provided to cardholder 145, and the statements may include information associated with, for example, transactions performed and balances of financial account 305 and reward accounts 310, 410. The statements may be provided periodically, and the frequency of provision of the statements may be associated with a billing cycle or may be unrelated to a billing cycle. The statements may include, for example, transaction information, account information, information associated with balances, and the like. In an exemplary embodiment, for instance, the periodic statements may include transaction-level information associated with transactions performed utilizing funds and/or rewards held in any one or all of financial account 305, rewards account 310, or rewards account 410. The transaction-level detail may include, for example, account identification numbers, financial account balance information, reward account balance information, cardholder identification information, merchant identification information, transaction location, transaction item identification information, transaction price, and the like.

The embodiments described above are illustrative examples of the present application and it should not be construed that the present application is limited to these particular embodiments. Various changes and modifications may be effected by one skilled in the art without departing from the spirit or scope of the invention as defined in the appended claims.

What is claimed is:

1. A method for processing a transaction initiated by an individual with a merchant using a transaction card having at least two magnetic stripes, the method comprising:
receiving information associated with the transaction, the information including account information and transaction information including a purchase amount;
determining according to the received information whether a first magnetic stripe or a second magnetic stripe was read at the merchant, the first magnetic stripe being associated with a financial account and the second magnetic stripe being associated with a rewards account;
converting the purchase amount to an amount of reward units, when it is determined that the second magnetic stripe was read at the merchant;
determining whether the rewards account has a balance of reward units at least equal to the amount of converted reward units;
authorizing the transaction if the balance of the rewards account is at least equal to the amount of converted reward units; and
decreasing the balance of the rewards account by at least the amount of converted reward units.

2. The method of claim 1, wherein the financial account is one of a credit account, a savings account, a checking account, a mortgage account, a brokerage account, a stored value account, a medical account, a transportation account, an academic account, or a home equity line of credit account.

3. The method of claim 1, wherein the account information includes personal identification number information.

4. The method of claim 3, further comprising: comparing the received personal identification number information with stored personal identification information; and preventing the authorizing of the transaction when the received personal identification number information does not match the stored personal identification information.

5. The method of claim 1, wherein the rewards account is a first rewards account and the financial account is a first financial account, and further comprising: increasing the balance of the first rewards account when the balance of the first rewards account is less than a predetermined quantity.

6. The method of claim 5, wherein a balance of the first financial account is reduced by a quantity corresponding to a value of the increase in the balance of the first rewards account.

7. The method of claim 5, wherein a balance of a second financial account is reduced by a quantity corresponding to a value of the increase in the balance of the first rewards account.

8. The method of claim 5, wherein a balance of a second rewards account is reduced by a quantity corresponding to a value of the increase in the balance of the first rewards account.

9. The method of claim 5, wherein the balance of the first rewards account is increased by a predetermined amount.

10. The method of claim 5, wherein the balance of the first rewards account is increased by a predetermined percentage of the balance of the first rewards account.

11. The method of claim 5, wherein the balance of the first rewards account is increased by a predetermined percentage of the balance of the first financial account.

12. The method of claim 1, wherein at least one of the transaction information or the account information is received via an automated clearing house network.

13. The method of claim 1, wherein the rewards account is a first rewards account, and further comprising: associating the second magnetic stripe with a second rewards account.

14. The method of claim 13, further comprising disassociating the second magnetic stripe from the first rewards account.

15. The method of claim 1, wherein the second magnetic stripe may be one of activated or deactivated.

16. The method of claim 15, wherein the activation or deactivation is performed in association with a request from the individual; and the request from the individual includes one of a telephonic communication, a postal mail communication, an email communication, a communication performed through an interface to an electronic communication network, or a communication via a credit/debit network.

17. The method of claim 15, wherein activation of the second magnetic stripe includes activation of the first magnetic stripe; and deactivation of the second magnetic stripe includes deactivation of the first magnetic stripe.

18. The method of claim 16, wherein the transaction card is a first transaction card; activation of the second magnetic stripe of the first transaction card includes activation of a second magnetic stripe of a second transaction card associated with the rewards account; and deactivation of the second magnetic stripe of the first transaction card includes deactivation of the second magnetic stripe of the second transaction card associated with the rewards account.

19. The method of claim 1, further comprising: providing a transaction statement to the individual, wherein the transaction statement includes at least the received transaction information, the received account information, information associated with a balance of the financial account, and information associated with the balance of the rewards account.

20. The method of claim 1, wherein the rewards account is associated with an overdraft account, and further comprising: decreasing a balance of the overdraft account by deducting a quantity associated with an overdraft percentage when it is determined that the rewards account does not have a balance of reward units at least equal to the amount of converted reward units.

21. The method of claim 20, wherein the overdraft percentage is determined by the individual.

22. The method of claim 20, wherein the quantity associated with the overdraft percentage deducted from the overdraft account is used to fund the transaction.

23. The method of claim 20, wherein the quantity associated with the overdraft percentage deducted from the overdraft account is used to purchase additional reward units; and the additional purchased reward units are deposited into the rewards account.

* * * * *